(12) United States Patent
Hara

(10) Patent No.: US 10,112,341 B2
(45) Date of Patent: Oct. 30, 2018

(54) THREE-DIMENSIONAL OBJECT MANUFACTURING METHOD

(71) Applicants: MIMAKI ENGINEERING CO., LTD., Nagano (JP); GRAPHIC CREATION Co., Ltd., Nagano (JP)

(72) Inventor: Hirofumi Hara, Nagano (JP)

(73) Assignees: MIMAKI ENGINEERING CO., LTD., Nagano (JP); GRAPHIC CREATION Co., Ltd., Nagano (JP)

( * ) Notice: Subject to any disclaimer, the term of this patent is extended or adjusted under 35 U.S.C. 154(b) by 2 days.

(21) Appl. No.: 15/604,669

(22) Filed: May 25, 2017

(65) Prior Publication Data

US 2017/0341293 A1    Nov. 30, 2017

(30) Foreign Application Priority Data

May 25, 2016 (JP) .................................. 2016-104511

(51) Int. Cl.
| | | |
|---|---|---|
| *B29C 64/188* | (2017.01) | |
| *B29C 64/40* | (2017.01) | |
| *B33Y 10/00* | (2015.01) | |
| *B29C 64/10* | (2017.01) | |
| *B33Y 30/00* | (2015.01) | |
| *B29C 35/08* | (2006.01) | |

(52) U.S. Cl.
CPC ............ *B29C 64/10* (2017.08); *B29C 64/188* (2017.08); *B29C 64/40* (2017.08); *B33Y 10/00* (2014.12); *B33Y 30/00* (2014.12); *B29C 2035/0827* (2013.01)

(58) Field of Classification Search
CPC ........ B29C 64/188; B29C 64/40; B33Y 10/00
See application file for complete search history.

(56) References Cited

U.S. PATENT DOCUMENTS

| | | | | |
|---|---|---|---|---|
| 2011/0186081 A1* | 8/2011 | Dunn | ...................... | B08B 3/045 134/18 |
| 2015/0028523 A1* | 1/2015 | Jaker | ...................... | C08G 63/06 264/401 |

FOREIGN PATENT DOCUMENTS

| | | |
|---|---|---|
| JP | 2015-123687 | 7/2015 |
| JP | 2015123687 A * | 7/2015 |

* cited by examiner

*Primary Examiner* — Vu A Nguyen
(74) *Attorney, Agent, or Firm* — JCIPRNET

(57) ABSTRACT

A three-dimensional object manufacturing method includes a 3D object forming step of forming a three-dimensional object by discharging a UV curing type ink, and then carrying out UV irradiation on the discharged ink to form a layer, and overlapping a plurality of the layers (S101); a support material removing step of removing a support material from the three-dimensional object (S102), and a siloxane applying step of applying an organopolysiloxane solution for suppressing whitening of a surface of the three-dimensional object on the surface of the three-dimensional object (S104), where the organopolysiloxane solution is a solution having alcohol for making the support material transparent as a solvent, and having the organopolysiloxane compound for forming a film on the surface of the three-dimensional object by the drying of alcohol as a solute.

10 Claims, 11 Drawing Sheets

| | After support material removing step | | | |
|---|---|---|---|---|
| | No work | Surface grinding step | Lacquer clear paint application | Surface grinding step → Lacquer clear paint application | Siloxane applying step → Excess applied solution removing step | Surface grinding step → Siloxane applying step → Excess applied solution removing step |
| State of bump | 1 | 4 | 3 | 6 | 2 | 5 |
| State of whitening | 1 | 3 | 2 | 4 | 5 | 6 |

FIG. 8

THREE-DIMENSIONAL OBJECT MANUFACTURING METHOD

CROSS REFERENCE TO RELATED APPLICATIONS

This application claims the priority benefit of Japanese Patent Application No. 2016-104511, filed on May 25, 2016. The entirety of the above-mentioned patent application is hereby incorporated by reference herein and made a part of this specification.

TECHNICAL FIELD

The present disclosure relates to a three-dimensional object manufacturing method for manufacturing a three-dimensional object by discharging a UV curing type ink, and thereafter, carrying out UV irradiation on the discharged ink to form a layer, and overlapping a plurality of layers.

DESCRIPTION OF THE BACKGROUND ART

A three-dimensional object manufacturing method including a 3D object forming step of forming a three-dimensional object by discharging a UV curing type ink, and thereafter, carrying out UV irradiation on the discharged ink to form a layer, and overlapping a plurality of layers is conventionally known (see e.g., Japanese Unexamined Patent Publication No. 2015-123687). For example, as shown in FIGS. 9A and 9B, the 3D object forming step is a step of forming the three-dimensional object by discharging a model material 91 serving as an ink to become at least a part of the three-dimensional object and a support material 92 serving as an ink at least disposed on a lower side of the model material 91 in a vertical direction indicated with an arrow 90a to support the model material 91, and thereafter, carrying out UV irradiation on the discharged model material 91 and the support material 92 to form a layer 93, and overlapping a plurality of layers 93. The 3D object forming step sometimes includes a step of moving a planarizing member 94 in an extending direction of the layer 93, that is, a direction indicated with an arrow 90b with respect to the model material 91 and the support material 92 while the model material 91 and the support material 92 are adjacent to each other to simultaneously planarize the surface of the model material 91 and the surface of the support material 92 with the planarizing member 94 before curing.

SUMMARY

It is ideal to form the three-dimensional object shown in FIGS. 10A and 10B through the 3D object forming step by planarizing the surface of the model material 91 and the surface of the support material 92 before curing.

Actually, however, the model material 91 and the support material 92 are dragged by the planarizing member 94 when planarizing the surfaces of the model material 91 and the support material 92, and hence one of either the model material 91 or the support material 92 tends to mix with the other material in a moving direction indicated with the arrow 90b of the planarizing member 94 with respect to the model material 91 and the support material 92, as shown in FIGS. 9A and 9B, if the surface of the model material 91 and the surface of the support material 92 are simultaneously planarized by the planarizing member 94 before curing.

As the support material 92 is water soluble, a three-dimensional object 95 as shown in FIGS. 11A and 11B, for example, can be obtained by removing the support material 92 using tap water from the three-dimensional object shown in FIGS. 9A and 9B.

The three-dimensional object 95 has a great number of bumps 95a, formed when one of the model material 91 or the support material 92 (see FIGS. 9A and 9B) is mixed with the other material, on a surface intersecting the direction indicated with the arrow 90b. In the three-dimensional object 95, the support material 92 tends to easily remain on the surface such as at the portion of bump 95a, and the like even if the support material 92 is removed using tap water. Thus, the conventional three-dimensional object manufacturing method has a problem in that one part of the three-dimensional object tends to be whitened as the color of the portion where the support material 92 remains is subjected to the influence of white, which is the color of the support material 92.

The present disclosure provides a three-dimensional object manufacturing method capable of suppressing whitening of the three-dimensional object.

A three-dimensional object manufacturing method of the present disclosure relates to a three-dimensional object manufacturing method including a 3D object forming step of forming a three-dimensional object by discharging a UV curing type ink, carrying out UV irradiation on the discharged ink to form a layer, and overlapping a plurality of the layers; where the 3D object forming step includes, with a model material and a support material adjacent to each other, the model material serving as the ink to become at least a part of the three-dimensional object and the support material serving as the ink that is at least disposed on a lower side of the model material in a vertical direction to support the model material, a step of simultaneously planarizing a surface of the model material and a surface of the support material with a planarizing member before curing; the three-dimensional object manufacturing method further includes a support material removing step of removing the support material from the three-dimensional object after the 3D object forming step; and the three-dimensional object manufacturing method includes a support material removing step of removing the support material from the three-dimensional object after the 3D object forming step, and a whitening suppressing solution applying step of applying a whitening suppressing solution for suppressing whitening of a surface of the three-dimensional object on the surface after the support material removing step; and the whitening suppressing solution is a liquid containing a transparent liquid that makes the support material transparent, and a film forming substance that forms a film on the surface by the drying of the transparent liquid.

When the surfaces of the model material and the support material adjacent to each other are simultaneously planarized with the planarizing member before curing, the model material and the support material are dragged by the planarizing member, thus forming a bump on the surface of the three-dimensional object after the support material removing step. In the three-dimensional object, whitening is generated by the color of the support material remaining on the surface even after the support material removing step such as the portion of bumps formed after the support material removing step when the surfaces of the model material and the support material adjacent to each other are simultaneously planarized by the planarizing member before curing. The three-dimensional object manufacturing method of the present disclosure includes the whitening suppressing solution applying step of applying the whitening suppressing solution on the surface of the three-dimensional object after the support material removing step, and hence after the support material remaining on the surface of the three-dimensional object after the support material removing step is made transparent with the transparent liquid of the whitening suppressing solution, a film is formed by a film forming substance of the whitening suppressing solution on the surface of the three-dimensional object by the drying of the transparent liquid of the whitening suppressing solution so that the state of transparency of the support material can be maintained by the transparent liquid. Therefore, the three-dimensional object manufacturing method of the present disclosure can suppress the whitening of the three-dimensional object caused by the color of the support material remaining on the surface of the three-dimensional object after the support material removing step.

In the three-dimensional object manufacturing method of the present disclosure, the film forming substance may be siloxane.

According to such a configuration, the three-dimensional object manufacturing method of the present disclosure can efficiently apply the whitening suppressing solution on the surface of the three-dimensional object in the whitening suppressing solution applying step as the whitening suppressing solution has low stickiness, and hence the workability can be enhanced.

In the three-dimensional object manufacturing method of the present disclosure, the siloxane may be organopolysiloxane.

According to such a configuration, the three-dimensional object manufacturing method of the present disclosure can efficiently suppress the whitening of the three-dimensional object caused by the color of the support material remaining on the surface of the three-dimensional object after the support material removing step.

The three-dimensional object manufacturing method of the present disclosure may include a surface grinding step of grinding the surface after the support material removing step and before the whitening suppressing solution applying step.

According to such a configuration, the three-dimensional object manufacturing method of the present disclosure can reduce the bump formed on the surface of the three-dimensional object as the surface of the three-dimensional object is ground in the surface grinding step, and can suppress the whitening of the three-dimensional object caused by the diffused reflection of light by the bump formed on the surface of the three-dimensional object.

In the three-dimensional object manufacturing method of the present disclosure, the whitening suppressing solution applying step may repeat, over plural times, application of the whitening suppressing solution to the surface and drying of the solution.

According to such a configuration, in the three-dimensional object manufacturing method of the present disclosure, the process "the whitening suppressing solution enters the bump formed on the surface of the three-dimensional object, and thereafter, a film consisting of a film forming substance of the whitening suppressing solution forms on the surface of the three-dimensional object by the drying of a transparent liquid of the whitening suppressing solution" is repeated over plural times to planarize the surface of the three-dimensional object. Therefore, the three-dimensional object manufacturing method of the present disclosure can reduce the bump formed on the surface of the three-dimensional object by the dragging of the model material and the support material involved in the planarization of the planarizing member, and can suppress whitening of the three-dimensional object caused by the diffused reflection of light by the bump formed on the surface of the three-dimensional object.

A three-dimensional object manufacturing method of the present disclosure can suppress whitening of the three-dimensional object.

BRIEF DESCRIPTION OF THE DRAWINGS

FIG. 8 is a view showing one example of a difference in a state of the surface of the three-dimensional object by a plurality of three-dimensional object manufacturing methods including the three-dimensional object manufacturing method shown in FIG. 3.

DETAILED DESCRIPTION OF EMBODIMENTS

Hereinafter, an embodiment of the present disclosure will be described with reference to the drawings.

First, a configuration of a 3D printer used in a three-dimensional object manufacturing method according to one embodiment of the present disclosure will be described.

Figure 1A:
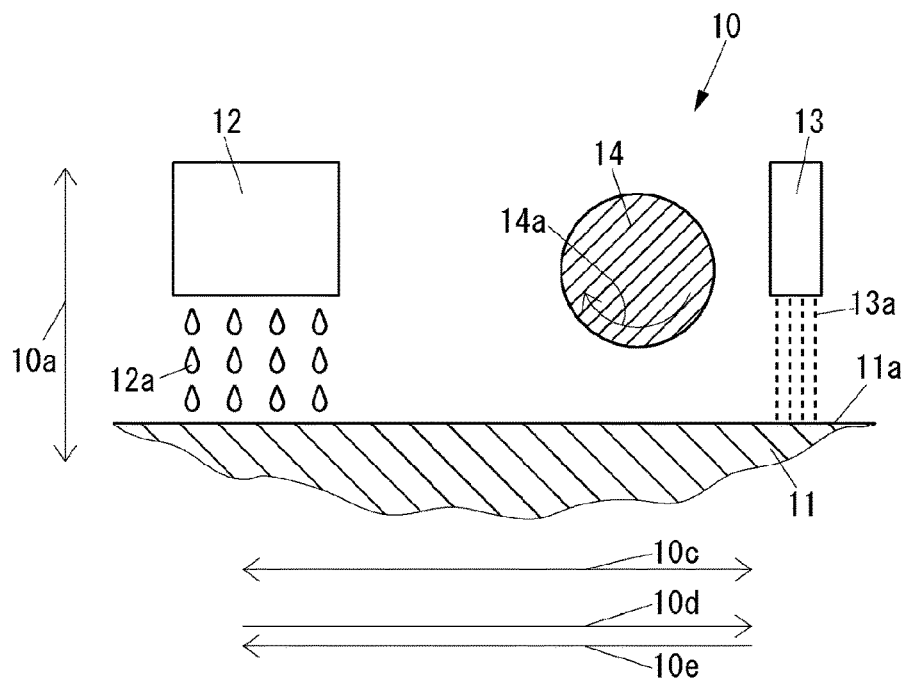
FIG. 1A is a schematic front cross-sectional view of a 3D printer used in a three-dimensional object manufacturing method according to one embodiment of the present disclosure.
Figure 1B:
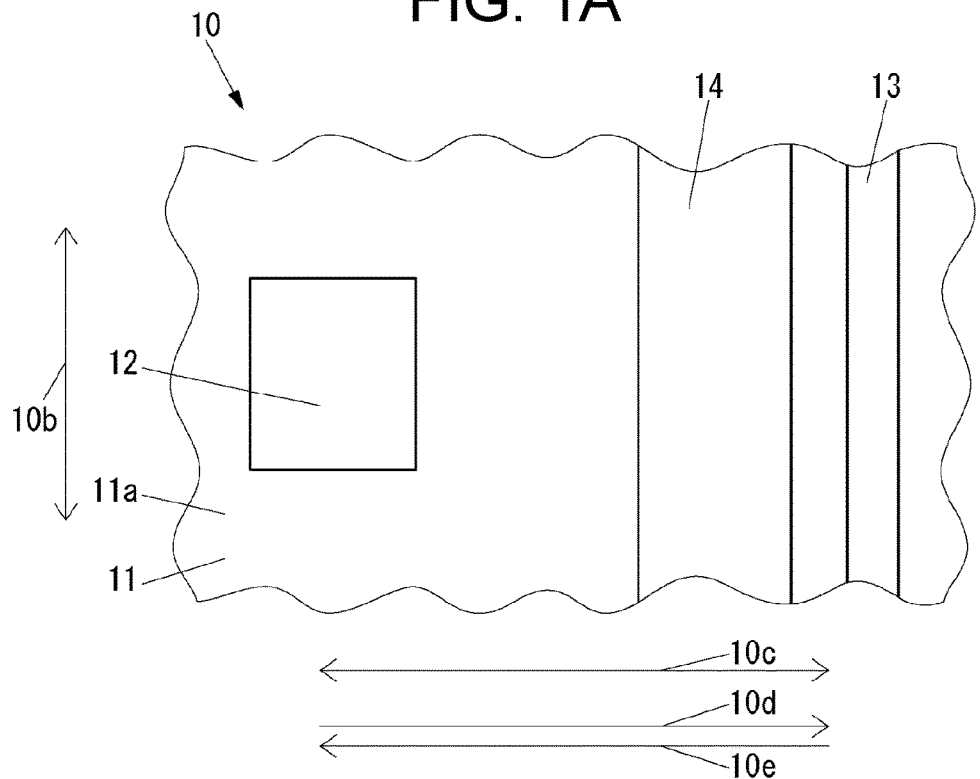
FIG. 1B is a schematic plan view of the 3D printer shown in FIG. 1A.

FIG. 1A is a schematic front cross-sectional view of a 3D printer 10 used in the three-dimensional object manufacturing method according to the present embodiment. FIG. 1B is a schematic plan view of the 3D printer 10.

As shown in FIGS. 1A and 1B, the 3D printer 10 includes a shaping platform 11 to become a platform of a three-dimensional object when manufacturing the three-dimensional object, an ink jet head 12 that discharges UV (ultraviolet) curing type ink 12*a* toward the shaping platform 11, an UV irradiator 13 that irradiates UV 13*a* with respect to the ink 12*a* discharged by the ink jet head 12 to cure the ink 12*a*, and a planarizing roller 14 serving as a planarizing member that planarizes the surface of the ink 12*a* before the ink 12*a* discharged by the ink jet head 12 is cured.

The shaping platform 11 is formed with a surface 11*a* on which the three-dimensional object is formed. The surface 11*a* is orthogonal to a vertical direction indicated with an arrow 10*a*.

The ink jet head 12 discharges the ink 12*a* in a direction indicated with the arrow 10*a* toward the shaping platform 11. The ink 12*a* includes a model material, which becomes at least a part of the three-dimensional object, and a support material at least disposed on a lower side of the model material in the vertical direction indicated with the arrow 10*a* to support the model material.

The model material includes a color portion ink for forming a color portion of a specific thickness such as, for example, 300 µm on a surface side of the three-dimensional object, and a base portion ink for forming a base portion on an inner side of the color portion in the three-dimensional object. The color portion ink includes a color ink, and a clear ink that compensates for the lack of layering height caused by the reduction of usage amount of the color ink when the usage amount of the color ink is reduced to represent a light color.

The support material becomes white when cured. The support material needs to be eventually removed, and thus has a property of easily breaking and a property of easily dissolving in water, that is, a property of being water soluble and a property of easily dissolving in alcohol. Furthermore, the support material has a property of particularly easily dissolving with respect to alcohol used as a solvent of siloxane, and has a property of being colorless, that is, transparent due to the presence of alcohol. Siloxane is a substance having a siloxane bond.

The UV irradiator 13 irradiates the UV 13*a* in the direction indicated with the arrow 10*a* toward the ink 12*a* discharged by the ink jet head 12.

The planarizing roller 14 is extended in a direction indicated with an arrow 10*b* orthogonal to the direction indicated with the arrow 10*a*.

Figure 2:
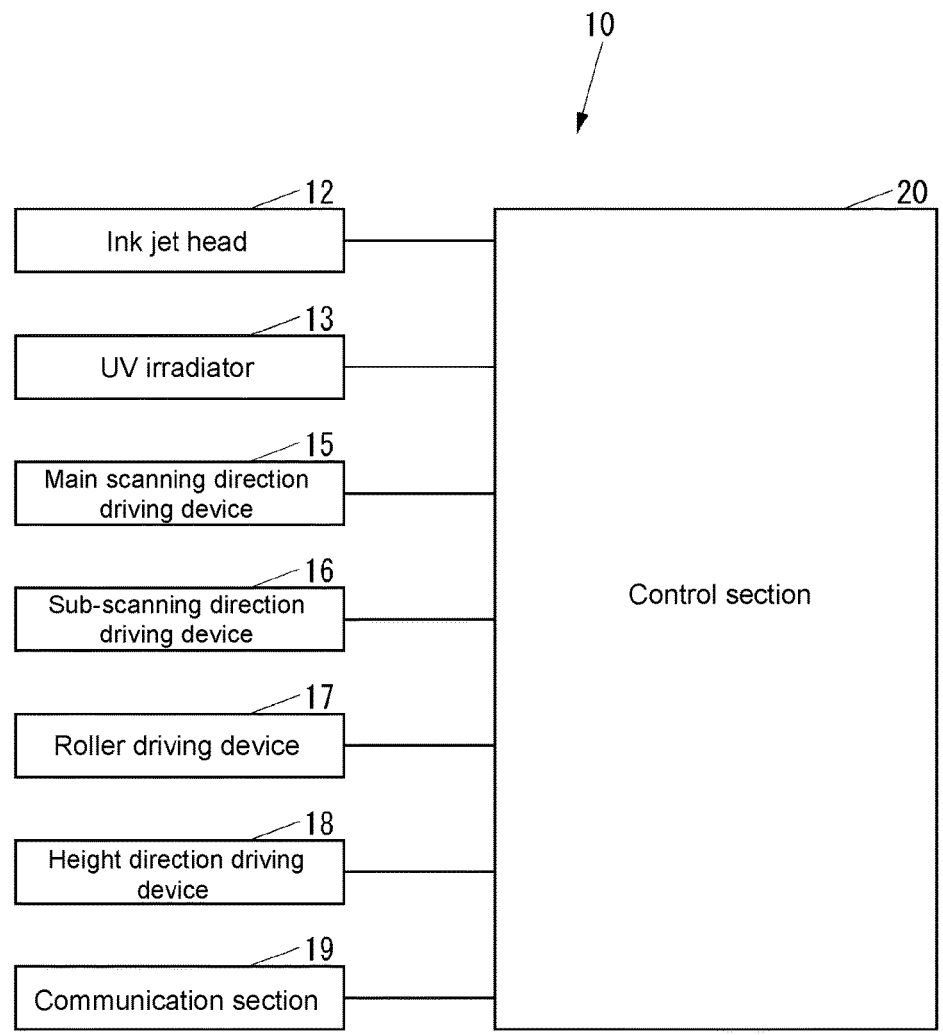
FIG. 2 is a block diagram of the 3D printer shown in FIGS. 1A and 1B.

FIG. 2 is a block diagram of the 3D printer 10.

As shown in FIGS. 1A, 1B and 2, the 3D printer 10 includes a main scanning direction driving device 15 that relatively moves one of the shaping platform 11 or the ink jet head 12 with respect to the other component in the direction indicated with the arrow 10*b*.

The 3D printer 10 includes a sub-scanning direction driving device 16 that relatively moves one of the shaping platform 11 and the ink jet head 12, the UV irradiator 13 and the planarizing roller 14 with respect to the other component in a direction indicated with an arrow 10*c* orthogonal to both the direction indicated with the arrow 10*a* and the direction indicated with the arrow 10*b*.

The 3D printer 10 includes a roller driving device 17 that rotates the planarizing roller 14 in a direction indicated with an arrow 14*a*.

The 3D printer 10 includes a height direction driving device 18 that relatively moves one of the shaping platform 11 and the ink jet head 12, the UV irradiator 13, and the planarizing roller 14 with respect to the other component in the direction indicated with the arrow 10*a*.

The 3D printer 10 further includes a communication section 19, which is a communication device that carries out communication with an external device via a network (not shown), and a control section 20 that controls the entire 3D printer 10.

The control section 20 includes, for example, a CPU (Central Processing Unit), a ROM (Read Only Memory) for storing programs and various types of data in advance, and a RAM (Random Access Memory) used as a work region of the CPU. The CPU executes the program stored in the ROM.

Next, the three-dimensional object manufacturing method according to the present embodiment will be described.

Figure 3:
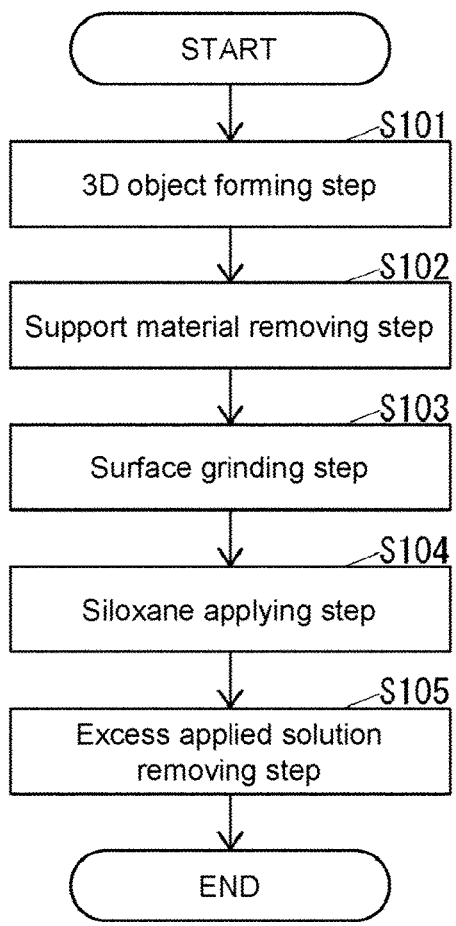
FIG. 3 is a flowchart of steps of the three-dimensional object manufacturing method executed using the 3D printer shown in FIGS. 1A and 1B.

FIG. 3 is a flowchart of steps of the three-dimensional object manufacturing method executed using the 3D printer 10.

As shown in FIG. 3, in the three-dimensional object manufacturing method according to the present embodiment, a 3D object forming step of forming the three-dimensional object with the support material with the 3D printer 10 is first executed (S101).

Next, a support material removing step of removing the support material from the three-dimensional object formed in the 3D object forming step of S101 is executed (S102).

Then, a surface grinding step of grinding the surface of the three-dimensional object, from which the support material is removed in the support material removing step of S102, is executed (S103).

A siloxane applying step serving as a whitening suppressing solution applying step of applying organopolysiloxane solution serving as a whitening suppressing solution for suppressing whitening of the surface of the three-dimensional object on the surface of the three-dimensional object, which surface is ground in the surface grinding step of S103, is then executed (S104). The organopolysiloxane solution is a solution having alcohol serving as a transparent liquid for making the support material transparent as a solvent, and having the organopolysiloxane compound serving as a film forming substance for forming a film on the surface of the three-dimensional object by the drying of alcohol as a solute.

Lastly, an excess applied solution removing step of removing the organopolysiloxane solution applied in the siloxane applying step of S104 is executed (S105), thus manufacturing the three-dimensional object.

Hereinafter, each step of the three-dimensional object manufacturing method according to the present embodiment will be described.

First, the 3D object forming step will be described.

When shaping data is input through the communication section 19, the control section 20 of the 3D printer 10 controls the ink jet head 12, the UV irradiator 13, the main scanning direction driving device 15, the sub-scanning direction driving device 16, the roller driving device 17, and the height direction driving device 18 based on the input shaping data to form the three-dimensional object with the support material.

Here, the shaping data is configured by a plurality of cross-sectional data generated using a method called slice with respect to the data of a three-dimensional object. The control section 20 forms a layer by executing printing based on the cross-sectional data. The printing is executed in order based on the plurality of cross-sectional data contained in the shaping data to overlap a plurality of layers and form the three-dimensional object. An overhanging portion in the three-dimensional object is formed by executing printing by the model material on the platform after the platform is formed with the support material at an underlayer.

The 3D object forming step will be described in detail below.

Figure 4:
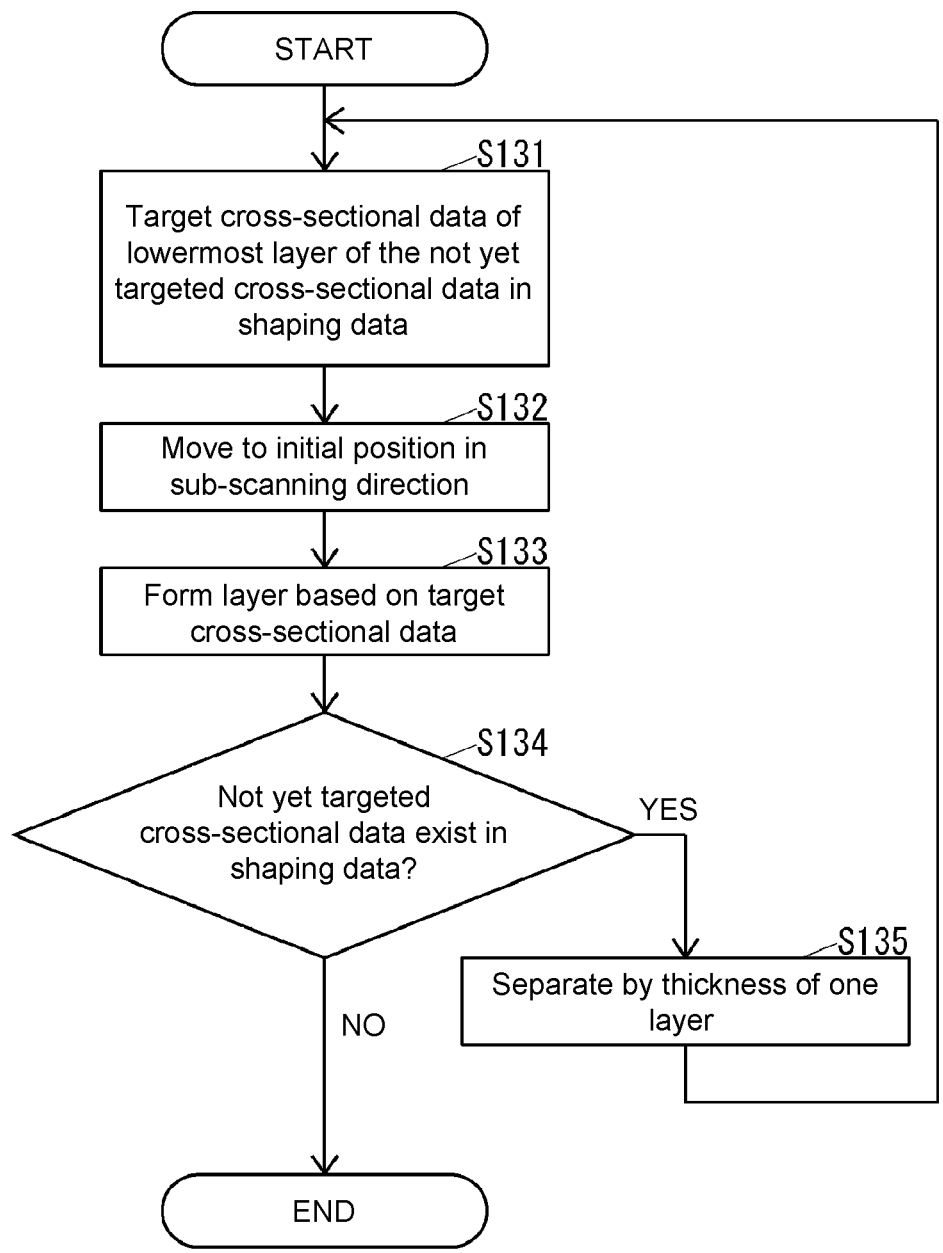
FIG. 4 is a flowchart of a 3D object forming step shown in FIG. 3.

FIG. 4 is a flowchart of the 3D object forming step.

As shown in FIG. 4, the control section 20 targets the cross-sectional data of the lowermost layer of the not yet targeted cross-sectional data in the shaping data (S131).

Next, the control section 20 controls the sub-scanning direction driving device 16 to arrange the ink jet head 12, the UV irradiator 13, and the planarizing roller 14 at initial positions in the direction indicated with the arrow 10c with respect to the shaping platform 11 (S132). Here, the initial position in the direction indicated with the arrow 10c is, for example, a position where the ink jet head 12, the UV irradiator 13, and the planarizing roller 14 are arranged at an end in the direction indicated with an arrow 10d (see FIGS. 1A and 1B) of the direction indicated with the arrow 10c with respect to the shaping platform 11.

Figure 5:
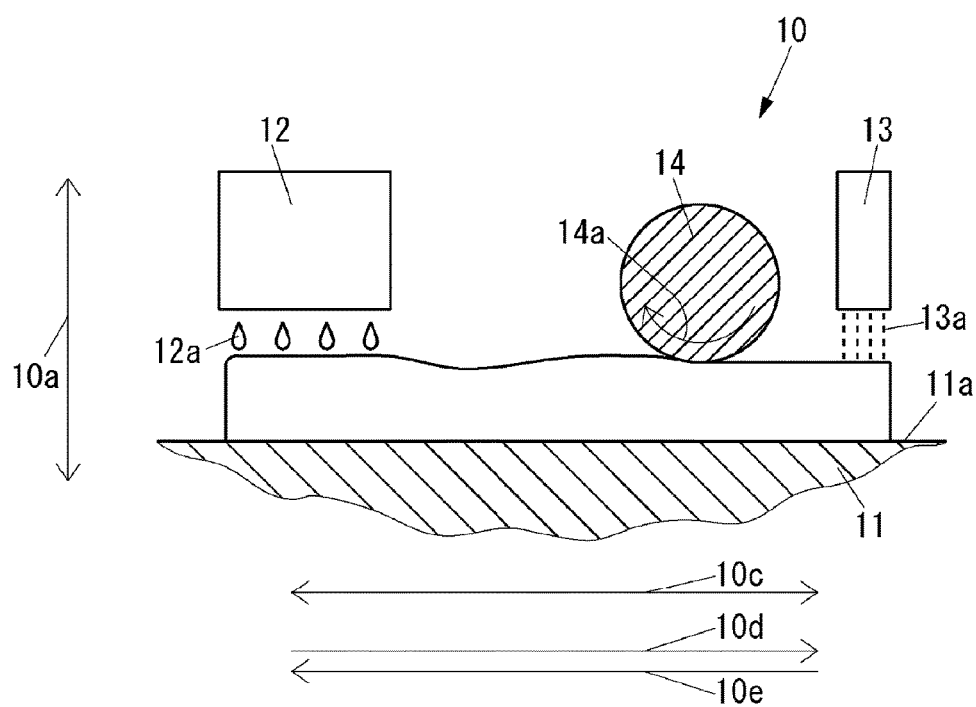
FIG. 5 is a schematic front cross-sectional view of the 3D printer at one time point of the 3D object forming step shown in FIG. 4.

After the process of S132, the control section 20 controls the ink jet head 12, the UV irradiator 13, the main scanning direction driving device 15, the sub-scanning direction driving device 16, and the roller driving device 17 based on the target cross-sectional data to form one layer (S133). In other words, the control section 20 causes the ink jet head 12 to discharge the ink 12a while moving the ink jet head 12 in the direction indicated with the arrow 10b by the main scanning direction driving device 15. As shown in FIG. 5, the control section 20 rotates the planarizing roller 14 in the direction indicated with the arrow 14a by the roller driving device 17 while the planarizing roller 14 is making contact with the surface of the ink 12a discharged by the ink jet head 12 to planarize the surface of the ink 12a. The control section 20 UV irradiates the ink 12a, which surface is planarized by the planarizing roller 14, with the UV irradiator 13 to cure the ink 12a in a state that the surface is planarized. The control section 20 then controls the sub-scanning direction driving device 16 to repeatedly execute the discharging of the ink 12a, the planarizing of the surface of the ink 12a, and the curing of the ink 12a described above while relatively moving the ink jet head 12, the UV irradiator 13, and the planarizing roller 14 in a direction indicated with an arrow 10e, which is a direction opposite the direction indicated with the arrow 10d, with respect to the shaping platform 11.

The surface of the ink 12a discharged and landed from the ink jet head 12 is not flat until the surface is planarized by the planarizing roller 14, as shown in FIG. 5. Specifically, the landed ink 12a has a vicinity of a center in a horizontal direction recessed toward a lower side in the vertical direction indicated with the arrow 10a by its own weight, and a vicinity of an end in the horizontal direction expanded toward an upper side in the vertical direction indicated with the arrow 10a by surface tension by an amount the vicinity of the center in the horizontal direction is recessed. Thus, in order to form a layer of uniform thickness, the ink 12a in a state that the surface is planarized needs to be cured by the UV irradiator 13 after planarizing the surface of the ink 12a while removing one part of the ink 12a with the planarizing roller 14.

As shown in FIG. 4, the control section 20 determines whether or not the not yet targeted cross-sectional data exists in the shaping data after the process of S133 (S134).

When determining that the not yet targeted cross-sectional data exists in the shaping data in S134, the control section 20 controls the height direction driving device 18 for the formation of the next layer to separate the shaping platform 11, and the ink jet head 12, the UV irradiator 13, and the planarizing roller 14 by the thickness of one layer from the current state (S135). The thickness of one layer is the thickness of each layer cured in a state that the surface is planarized, and is, for example 30 μm.

After the process of S135, the control section 20 executes the process of S131.

When determining that the not yet targeted cross-sectional data does not exist in the shaping data in S134, the control section 20 terminates the operation shown in FIG. 4.

Figure 6A:
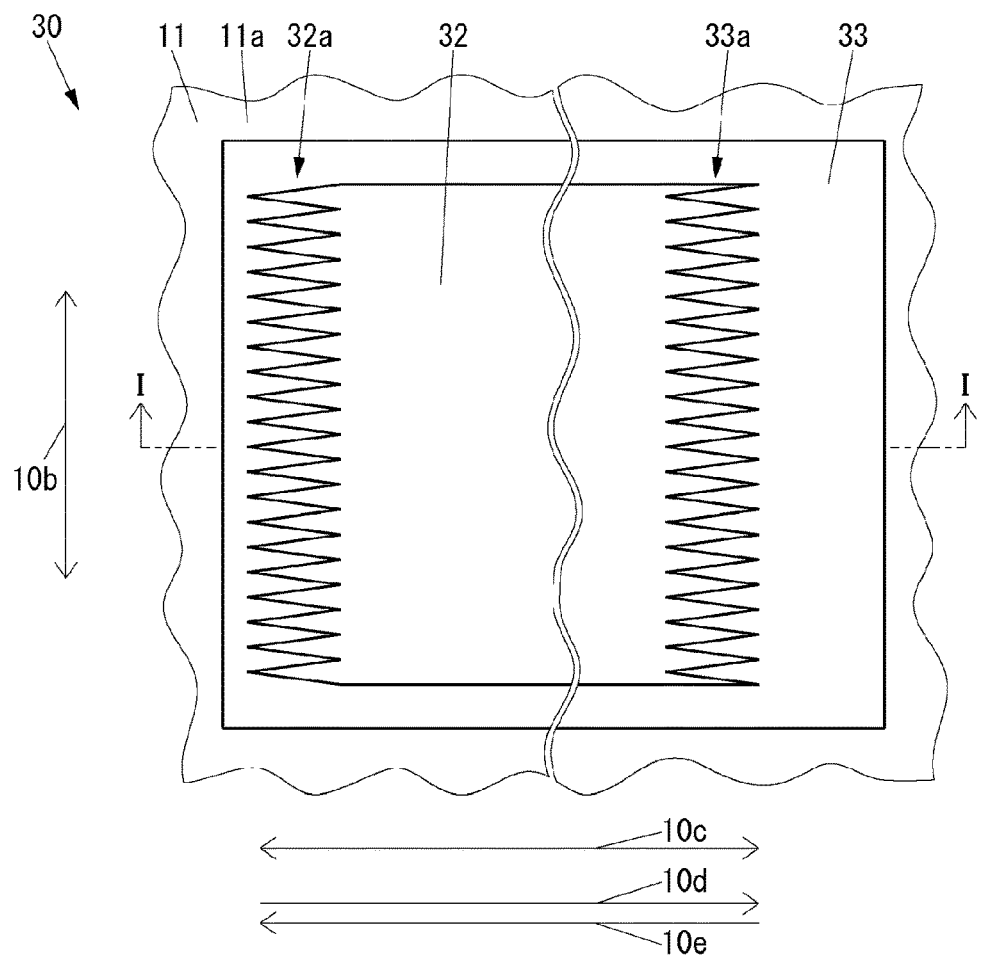
FIG. 6A is a plan view of a three-dimensional object immediately after being formed by the 3D object forming step shown in FIG. 4.
Figure 6B:
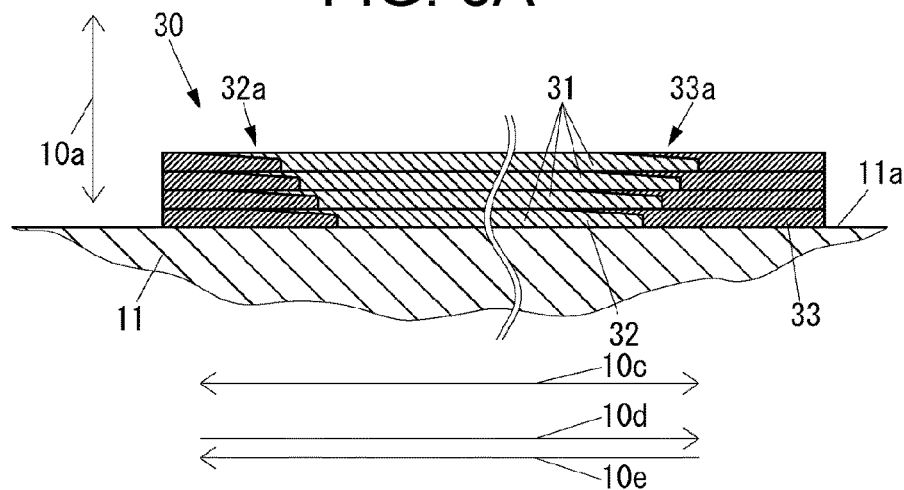
FIG. 6B is a cross-sectional view taken along I-I shown in FIG. 6A.

The three-dimensional object with the support material is formed as shown in FIGS. 6A and 6B, for example, by the 3D object forming step.

FIG. 6A is a plan view of a three-dimensional object 30 immediately after being formed by the 3D object forming step. FIG. 6B is a cross-sectional view taken along I-I shown in FIG. 6A.

As shown in FIGS. 6A and 6B, the three-dimensional object 30 is formed by overlapping a plurality of layers 31. Each layer 31 includes a model material portion 32 formed by the model material, and a support material portion 33 configured by the support material. The model material portion 32 is formed with a great number of projections 32a, formed when dragged by the planarizing roller 14, on a surface to which the support material portion 33 is adjacent in the direction indicated with the arrow 10e, which is the moving direction of the planarizing roller 14 with respect to the shaping platform 11 at the time of planarizing of the surface of the ink 12a of the surface intersecting the direction indicated with the arrow 10c. Similarly, the support material portion 33 is formed with a great number of projections 33a, formed when dragged by the planarizing roller 14, on a surface to which the model material portion 32 is adjacent in the direction indicated with the arrow 10e of the surface intersecting the direction indicated with the arrow 10c.

In the 3D object forming step, the projection 32a and the projection 33a can be suppressed from being formed unless the printing of the model material and the printing of the support material are simultaneously executed. For example, after carrying out the discharging of the ink 12a, the planarizing of the surface of the ink 12a, and the curing of the ink 12a for one of the model material or the support material, the discharging of the ink 12a, the planarizing of the surface of the ink 12a, and the curing of the ink 12a are carried out for the other one of the model material or the support material to suppress the projection 32a and the projection 33a from being formed at a portion where the model material and the support material become adjacent to each other. However, when the printing of the model material and the printing of the support material are not simultaneously executed, the time of the 3D object forming step is greatly increased.

Next, the support material removing step will be described.

The three-dimensional object formed in the 3D object forming step is detached from the 3D printer 10, and the support material is removed using tap water from the three-dimensional object 30 with the support material. As described above, the support material is water soluble, and thus can be removed with tap water. When a small amount of Buthicenol 30 (manufactured by KH Neo Chem Co.) is added to the tap water, this accelerates the dissolving of the support material to the tap water, thus enhancing the efficiency of removing the support material. The additive amount of Buthicenol 30 to the tap water is most preferably 2 to 15%. Furthermore, an ultrasonic washer is used to accelerate the dissolving of the support material to the tap water, thus enhancing the efficiency of removing the support material. It is also effective to use a stirrer for stirring the tap water, which is the solvent, in place of the ultrasonic washer. The effect of stirring can be enhanced and the efficiency of removing the support material can be further enhanced by using a baffle plate with the stirrer.

Figure 7A:
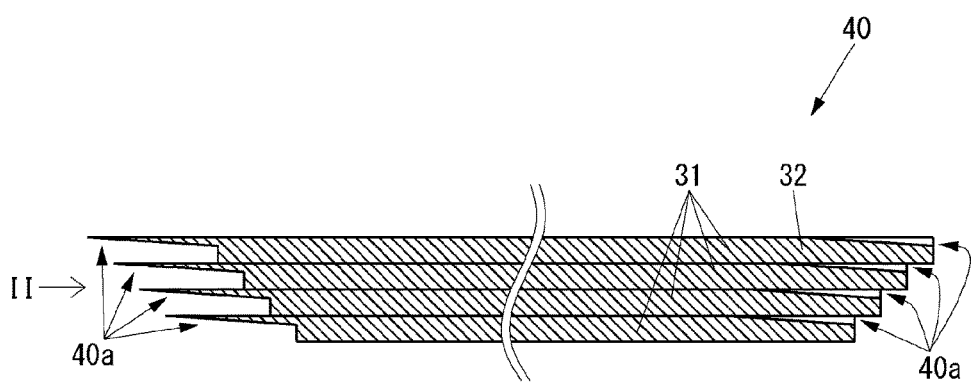
FIG. 7A is a plan view of a three-dimensional object immediately after being formed by the support material removing step shown in FIG. 3.
Figure 7B:
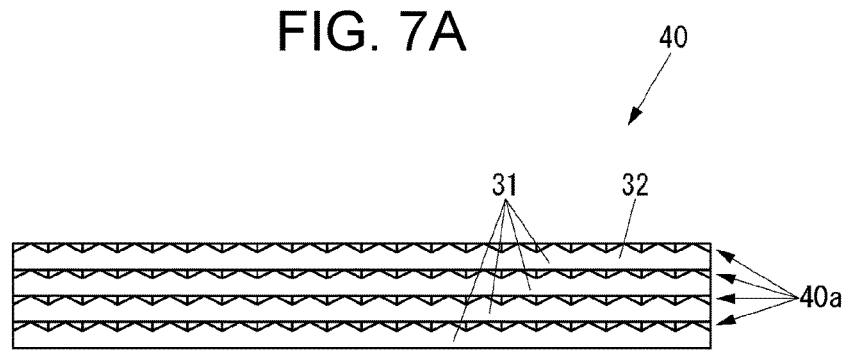
FIG. 7B is a view seen from an arrow II shown in FIG. 7A.
Figure 9A:
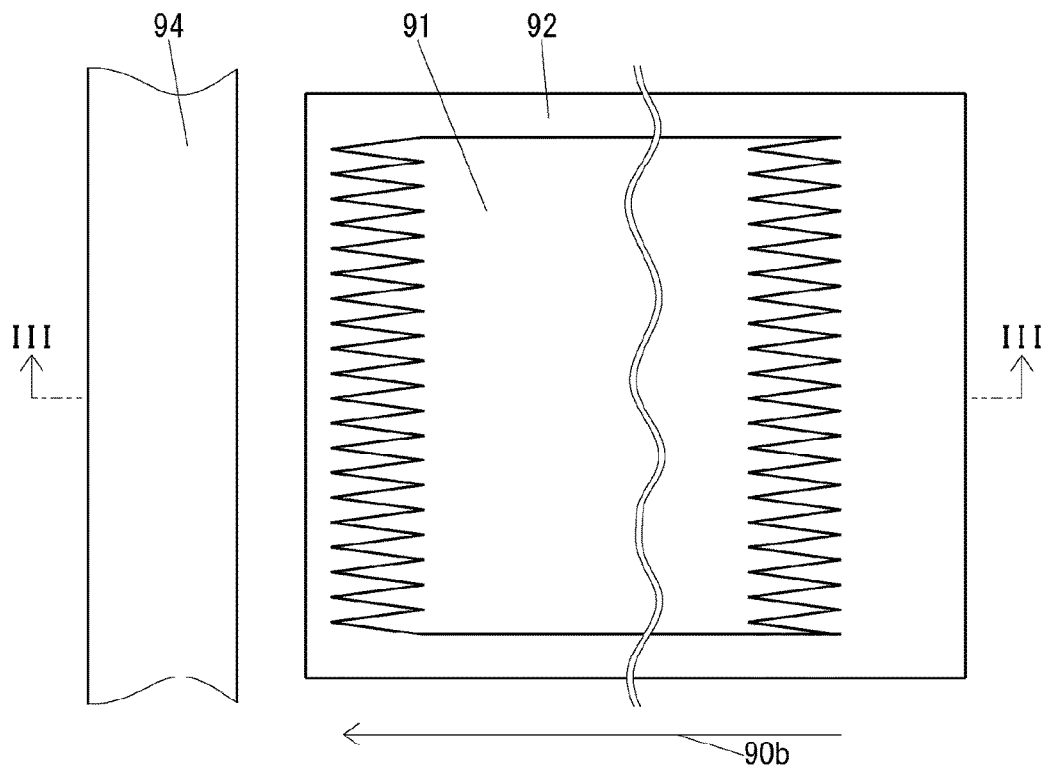
FIG. 9A is a plan view of a three-dimensional object immediately after being formed by a 3D object forming step in a conventional three-dimensional object manufacturing method.
Figure 9B:
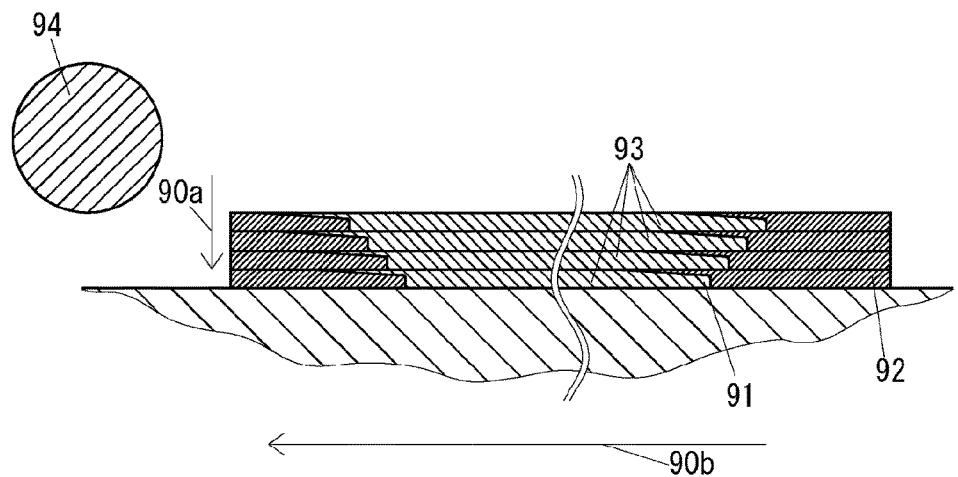
FIG. 9B is a cross-sectional view taken along shown in FIG. 9A.
Figure 10A:
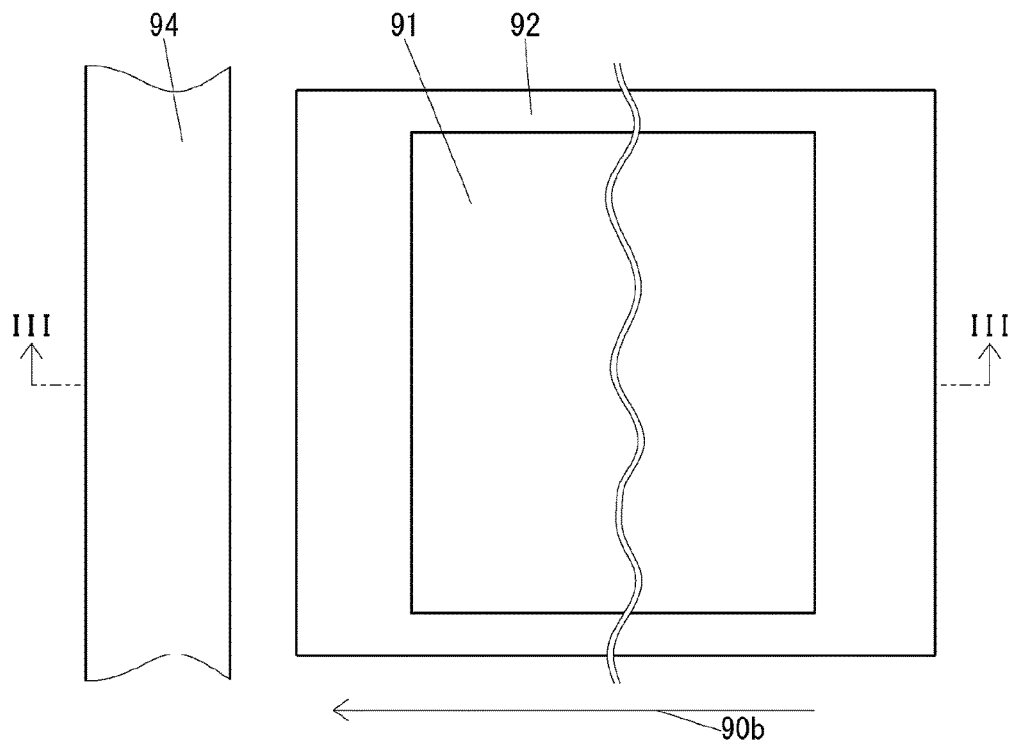
FIG. 10A is a plan view of a three-dimensional object immediately after being formed by an ideal 3D object forming step in a conventional three-dimensional object manufacturing method.
Figure 10B:
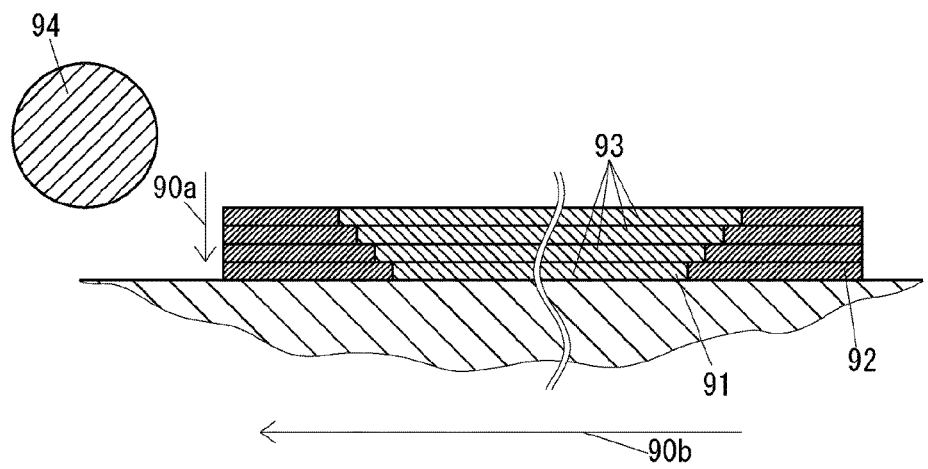
FIG. 10B is a cross-sectional view taken along IV-IV shown in FIG. 10A.
Figure 11A:
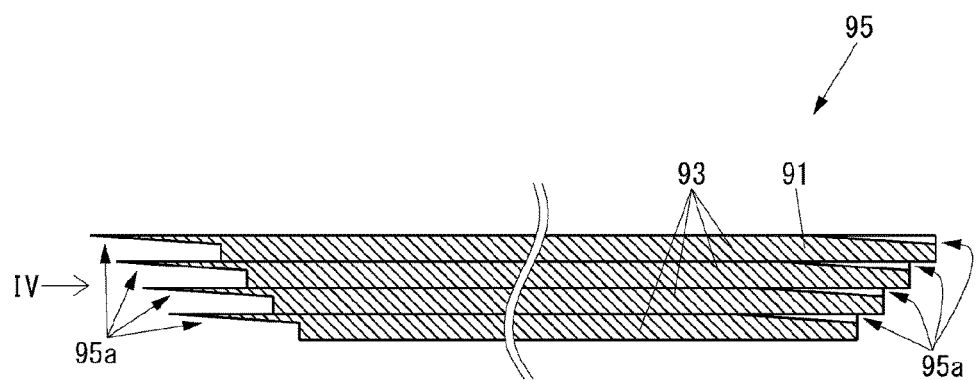
FIG. 11A is a plan view of a three-dimensional object immediately after being formed by a step after the 3D object forming step shown in FIGS. 9A and 9B.
Figure 11B:
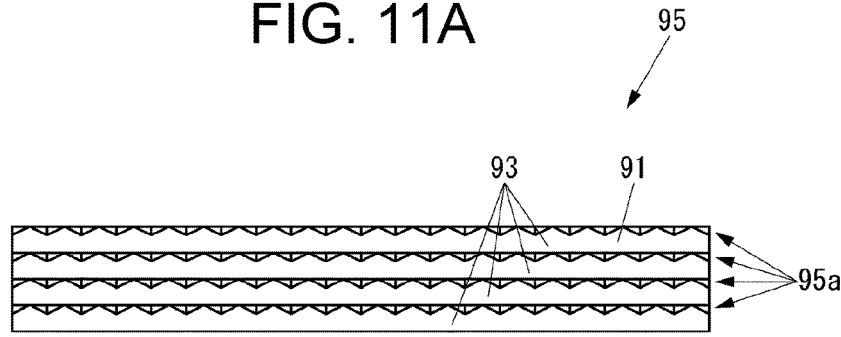
FIG. 11B is a view seen from an arrow IV shown in FIG. 11A.

FIG. 7A is a plan view of the three-dimensional object 40 immediately after being formed by the support material removing step. FIG. 7B is a view seen from an arrow II shown in FIG. 7A.

The three-dimensional object 40 shown in FIGS. 7A and 7B is that in which the support material is removed from the three-dimensional object 30 shown in FIGS. 6A and 6B.

As shown in FIGS. 7A and 7B, in the three-dimensional object 40, an area where the projection 32a of the model material portion 32 is present in the three-dimensional object 30 shown in FIGS. 6A and 6B appears as a great number of bumps 40a. Similarly, in the three-dimensional object 40, an area where the projection 33a of the support material portion 33 is present in the three-dimensional object 30 shown in FIGS. 6A and 6B appears as a great number of bumps 40a.

Although not illustrated, the three-dimensional object 40 sometimes has the support material portion 33 remaining at the portion of great number of bumps 40a even if the support material is removed using tap water in the support material removing step.

The length in the projecting direction of the bump 40a is, for example, around 150 μm. The bump 40a is the trace of the ink 12a dragged by the planarizing roller 14, and thus the length in the projecting direction differs by the diameter and the number of rotations of the planarizing roller 14. The length of around 150 μm is the length of when the diameter of the planarizing roller 14 is 15 mm and the number of rotations is 400 rpm. The greater the diameter of the planarizing roller 14 becomes, the greater the amount the ink 12a is dragged by the planarizing roller 14 becomes, and hence the length in the projecting direction of the bump 40a becomes long. Similarly, the smaller the number of rotations of the planarizing roller 14 becomes, the greater the amount the ink 12a is dragged by the planarizing roller 14 becomes, and hence the length in the projecting direction of the bump 40a becomes long.

The three-dimensional object 40 is whitened by the white support material portion 33 remaining at the portion of great number of bumps 40a, and the like. The three-dimensional object 40 is also whitened by diffused reflection of light by the great number of bumps 40a.

Next, the surface grinding step will be described.

The bump 40a is ground with a grinder in which a bit attached with a felt is attached to the rotating shaft to bring the portion of the bump 40a of the three-dimensional object 40, which support material is removed in the support material removing step, to a planar state. An appropriate felt corresponding to the shape and size of the area to grind is preferably used for the felt. Since the support material easily dissolves in alcohol, as described above, the support material portion 33 remaining at the portion of the bump 40a is easily stripped and thus is effective if the bump 40a is ground after wetting the three-dimensional object 40 with alcohol. When the bump 40a is ground after wetting the three-dimensional object 40 with liquid such as alcohol, and the like, the grinding powder is less likely to scatter, and hence the risk of the operator inhaling the grinding powder can be reduced.

After the grinding of the surface is finished, dirt attached to the surface of the three-dimensional object 40 is removed with a tool capable of removing only the dirt attached to the surface without grinding the surface of the three-dimensional object 40 such as a toothbrush, an electrical toothbrush and the like.

If the three-dimensional object 40 has a color portion of a specific thickness on the surface side, the bump 40a of the three-dimensional object 40 cannot be completely removed by the surface grinding step. If grinding is carried out in excess to completely remove the bump 40a, the color portion of a specific thickness such as, for example, 300 μm on the surface side of the three-dimensional object 40 will be completely removed, and the base portion on the inner side of the color portion may appear.

However, even if the portion of the bump 40a is not completely removed, the relevant portion can be brought closer to a planar shape, and thus the whitening caused by diffused reflection of light by the great number of bumps 40a can be alleviated.

The siloxane applying step will now be described.

The organopolysiloxane solution is applied with a brush or a cloth on the surface of the three-dimensional object 40, which surface is ground in the surface grinding step. Since the support material is changed from white to colorless with an alcohol, which is a solvent of the organopolysiloxane solution, as described above, the support material portion 33 is achromatized even if the support material portion 33 remains at the portion of great number of bumps 40a, and thus whitening is suppressed.

Then, the organopolysiloxane solution applied to the surface of the three-dimensional object 40 is dried by placing the three-dimensional object 40 on a cloth that easily absorbs the organopolysiloxane solution. As the cloth easily absorbs the organopolysiloxane solution and the organopolysiloxane solution itself is also not sticky but is smooth, even if the cloth is attached to a surface where the organopolysiloxane solution is not yet dried in the three-dimensional object 40 after applying the organopolysiloxane solution over the entire three-dimensional object 40, such cloth and the surface of the three-dimensional object 40 will not attach to each other by way of the organopolysiloxane solution. Therefore, the fibers of the cloth can be suppressed from attaching to the surface of the three-dimensional object 40.

Since the siloxane is applied to the surface of the three-dimensional object 40 by the siloxane applying step, when the support material portion 33 is remained on the surface of the three-dimensional object 40, the support material portion 33 remaining on the surface of the three-dimensional object 40 becomes transparent and colorless by the alcohol of the organopolysiloxane solution. Therefore, the whitening caused by the color of the support material portion 33 remaining on the surface of the three-dimensional object 40 is suppressed. Furthermore, as the drying of the organopolysiloxane solution advances from the interface, the support material portion 33 remaining on the surface of the three-dimensional object 40 is formed thereon with a film consisting of organopolysiloxane compound while remaining colorless. Therefore, the effect of suppressing the whitening by the color of the support material portion 33 remaining on the surface of the three-dimensional object 40 with the alcohol is maintained by the film consisting of organopolysiloxane compound formed on the support material portion 33 remaining on the surface of the three-dimensional object 40.

Furthermore, since the siloxane is applied to the surface of the three-dimensional object 40 by the siloxane applying step, the organopolysiloxane solution enters the bump 40a formed on the surface of the three-dimensional object 40, and thereafter, the film consisting of organopolysiloxane compound serving as the solute of the organopolysiloxane solution forms on the surface of the three-dimensional object 40 by the drying of alcohol of the organopolysiloxane solution, whereby the surface of the three-dimensional object 40 is planarized. The whitening caused by the diffused reflection of light by the bump 40a formed on the surface of the three-dimensional object 40 is thus suppressed.

The excess applied solution removing step will now be described.

After applying the organopolysiloxane solution to the surface of the three-dimensional object 40 in the siloxane applying step, the excessive organopolysiloxane solution remaining in a groove and the like in the three-dimensional object 40 is taken up and removed with a cloth after ten to twenty minutes.

As described above, when the surfaces of the model material and the support material adjacent to each other are simultaneously planarized with the planarizing roller 14 before curing, the model material and the support material are dragged by the planarizing roller 14, thus forming the bump 40a on the surface of the three-dimensional object 40 after the support material removing step. In the three-dimensional object 40, whitening is generated by the color of the support material remaining on the surface even after the support material removing step at the portion of the bump 40a, and the like. The three-dimensional object manufacturing method according to the present embodiment includes the siloxane applying step of applying the organopolysiloxane solution to the surface of the three-dimensional object after the support material removing step, and thus after the support material remaining on the surface of the three-dimensional object 40 after the support material removing step is made transparent with alcohol serving as the transparent liquid of the organopolysiloxane solution, the film is formed by the organopolysiloxane compound serving as the film forming substance of the organopolysiloxane solution on the surface of the three-dimensional object 40 by the drying of the alcohol of the organopolysiloxane solution to maintain the state of transparency of the support material by the alcohol. Therefore, the three-dimensional object manufacturing method according to the present embodiment can suppress the whitening of the three-dimensional object 40 caused by the color of the support material remaining on the surface of the three-dimensional object 40 after the support material removing step.

In the three-dimensional object 40, whitening is generated with the bump 40a as a cause of diffused reflection of light. In the three-dimensional object manufacturing method according to the present embodiment, even if the bump 40a is formed on the surface of the three-dimensional object 40 after the support material removing step when the surfaces of the model material and the support material adjacent to each other are simultaneously planarized with the planarizing roller 14 before curing, since the organopolysiloxane solution is applied to the surface of the three-dimensional object 40, the organopolysiloxane solution enters the bump 40a formed on the surface of the three-dimensional object 40, and thereafter, the film consisting of organopolysiloxane compound serving as the solute of the organopolysiloxane solution forms on the surface of the three-dimensional object 40 by the drying of alcohol of the organopolysiloxane solution, whereby the surface of the three-dimensional object 40 is planarized. Thus, the three-dimensional object manufacturing method according to the present embodiment can suppress the whitening of the three-dimensional object 40 by the dragging of the model material and the support material involved in the planarization by the planarizing roller 14. Therefore, when the three-dimensional object 40 includes the color portion of a specific thickness on the surface side, an appropriate light emission by the color portion can be obtained.

The three-dimensional object manufacturing method according to the present embodiment can efficiently suppress the whitening of the three-dimensional object 40 caused by the color of the support material remaining on the surface of the three-dimensional object 40 after the support material removing step by applying the organopolysiloxane solution on the surface of the three-dimensional object 40 in the siloxane applying step. However, the three-dimensional object manufacturing method according to the present embodiment can expect, to a certain extent, an effect of suppressing whitening of the three-dimensional object 40 even if the siloxane solution other than the organopolysiloxane solution is applied to the surface of the three-dimensional object 40 in the siloxane applying step.

The three-dimensional object manufacturing method according to the present embodiment can reduce the bump 40a formed on the surface of the three-dimensional object 40, and suppress the whitening of the three-dimensional object 40 caused by the diffused reflection of light by the bump 40a formed on the surface of the three-dimensional object 40 by grinding the surface of the three-dimensional object 40 in the surface grinding step. In other words, the three-dimensional object manufacturing method according to the present embodiment can enhance the evenness in the state of the surface of the three-dimensional object 40 by the alleviation of the size of the bump 40a and the alleviation of whitening of the surface of the three-dimensional object 40 by executing both the surface grinding step and the siloxane applying step.

Even if the surface grinding step is not executed, the whitening of the surface of the three-dimensional object 40 can be alleviated by executing the siloxane applying step.

In the three-dimensional object manufacturing method according to the present embodiment, the siloxane applying step may be a step of repeating, over plural times, application of the organopolysiloxane solution on the surface of the three-dimensional object 40 and drying of the solution. According to such a configuration, in the three-dimensional object manufacturing method according to the present embodiment, the process "the organopolysiloxane solution enters the bump 40a formed on the surface of the three-dimensional object 40, and thereafter, the film consisting of organopolysiloxane compound serving as the film forming substance of the organopolysiloxane solution forms on the surface of the three-dimensional object 40 by the drying of alcohol serving as the transparent liquid of the organopolysiloxane solution" is repeated over plural times to planarize the surface of the three-dimensional object 40. Therefore, the three-dimensional object manufacturing method according to the present embodiment can reduce the bump 40a formed on the surface of the three-dimensional object 40 by the dragging of the model material and the support material involved in the planarization by the planarizing roller 14, and suppress the whitening of the three-dimensional object 40 caused by the diffused reflection of light by the bump 40a formed on the surface of the three-dimensional object 40.

The portion not in the vicinity of the portion adjacent to the support material portion 33 in the surface of the three-dimensional object 40 is not formed with the bump 40a, and thus gloss occurs by the planarization. When the portion of the bump 40a is not completely removed, presence/absence of gloss may occur depending on the place at the surface of the three-dimensional object 40. Thus, when the portion of the bump 40a is not completely removed, a clear paint for deglossing the portion not in the vicinity of the portion adjacent to the support material portion 33 in the surface of the three-dimensional object 40 is manually applied to enhance the uniformity of gloss at the surface of the three-dimensional object 40.

In the present embodiment, the organopolysiloxane solution is described by way of example as the whitening suppressing solution. However, the whitening suppressing solution may not be the organopolysiloxane solution as long as it is the liquid containing the transparent liquid for making the support material transparent and the film forming substance for forming the film on the surface of the three-dimensional object 40 by the drying of the transparent liquid. Other than alcohol, for example, the transparent liquid may be water, and the like. Other than siloxane, for example, the film forming substance may be acrylic resin. For example, the whitening suppressing solution may be aquatic acrylic paint. The whitening suppressing solution is a solution in the present embodiment, but may be liquid in which the film forming substance is dispersed in the transparent liquid.

For example, when the aquatic acrylic paint, which is sticky until dried, is the whitening suppressing solution, if the undried surface of the aquatic acrylic paint touches somewhere in the whitening suppressing solution applying step, patterns and dirt, for example, attach to the undried surface, and the surface after being dried of the undried surface is not beautifully finished, and hence the undried surface of the aquatic acrylic paint cannot touch anywhere in the whitening suppressing solution applying step. Thus, the aquatic acrylic paint cannot be applied at one time on the entire surface of the three-dimensional object 40. However, the three-dimensional object manufacturing method according to the present embodiment can apply the whitening suppressing solution at one time on the entire surface of the three-dimensional object 40, for example, in the whitening suppressing solution applying step as the film forming substance is siloxane and the stickiness of the whitening suppressing solution is low. Therefore, the three-dimensional object manufacturing method according to the present embodiment can efficiently apply the whitening suppressing solution on the surface of the three-dimensional object 40 and enhance the workability.

In place of the whitening suppressing solution, consideration is made to planarize the surface of the three-dimensional object 40 by applying resin such as lacquer clear paint, and the like. However, the lacquer paint does not contain the transparent liquid that dissolves/makes transparent the support material such as alcohol, water and the like, and thus even if the whitening of the three-dimensional object 40 caused by the diffused reflection of light by the bump 40a formed on the surface of the three-dimensional object 40 can be suppressed, the whitening of the three-dimensional object 40 caused by the color of the support material remaining on the surface of the three-dimensional object 40 after the support material removing step cannot be suppressed. In other words, the effect of suppressing the whitening of the three-dimensional object 40 by the solution not containing the transparent liquid such as lacquer paint and the like is limited. Therefore, the whitening suppressing solution can effectively suppress the whitening of the three-dimensional object 40 by the diffused reflection of light and the whitening of the three-dimensional object 40 caused by the color of the support material remaining on the surface of the three-dimensional object 40, which is a dominant factor of whitening of the three-dimensional object 40.

FIG. 8 is a view showing one example of a difference in a state of the surface of the three-dimensional object by a plurality of three-dimensional object manufacturing methods including the three-dimensional object manufacturing method shown in FIG. 3.

FIG. 8 is created based on an experimental result. In FIG. 8, smaller number means poorer state. In other words, greater number means better state. When the state of the bump on the surface of the three-dimensional object is satisfactory, this means that the bump is suppressed compared to when the state of the bump on the surface of the three-dimensional object is poor. When the state of whitening of the surface of the three-dimensional object is satisfactory, this means that the whitening is suppressed compared to when the state of whitening of the surface of the three-dimensional object is poor.

In FIG. 8, the three-dimensional object manufacturing method of "no work" indicates a three-dimensional object manufacturing method in which the surface grinding step of S103, the siloxane applying step of S104, and the excess applied solution removing step of S105 are not executed after the support material removing step of S102 in the three-dimensional object manufacturing method shown in FIG. 3, that is, the three-dimensional object manufacturing method according to the present embodiment. The three-dimensional object manufacturing method of "no work" is the method in which the state of the bump on the surface of the three-dimensional object is the worst out of the six types of three-dimensional object manufacturing methods shown in FIG. 8. Furthermore, the three-dimensional object manufacturing method of "no work" is the method in which the state of whitening of the surface of the three-dimensional object is the worst out of the six types of three-dimensional object manufacturing methods shown in FIG. 8.

In FIG. 8, the three-dimensional object manufacturing method of "surface grinding step" indicates a three-dimensional object manufacturing method in which the surface grinding step of S103 is executed after the support material removing step of S102, and the siloxane applying step of S104 and the excess applied solution removing step of S105 are not executed in the three-dimensional object manufacturing method shown in FIG. 3. The three-dimensional object manufacturing method of "surface grinding step" is the method in which the state of the bump on the surface of the three-dimensional object is better than that in the three-dimensional object manufacturing method of "no work". The three-dimensional object manufacturing method of "surface grinding step" is the method in which the state of whitening of the surface of the three-dimensional object is better than that in the three-dimensional object manufacturing method of "no work".

In FIG. 8, the three-dimensional object manufacturing method of "lacquer clear paint application" indicates a three-dimensional object manufacturing method in which the surface grinding step of S103, the siloxane applying step of S104, and the excess applied solution removing step of S105 are not executed and the lacquer clear paint is applied after the support material removing step of S102 in the three-dimensional object manufacturing method shown in FIG. 3. However, with respect to the three-dimensional object manufacturing method of "lacquer clear paint application", the state of the bump and the whitening of the surface of the three-dimensional object shown in FIG. 8 is the state of when the number of times the lacquer clear paint is applied to the surface of the three-dimensional object is once. The three-dimensional object manufacturing method of "lacquer clear paint application" is the method in which the state of the bump on the surface of the three-dimensional object is better than that in the three-dimensional object manufacturing method of "no work" and worse than that in the three-dimensional object manufacturing method of "surface grinding step". Furthermore, the three-dimensional object manufacturing method of "lacquer clear paint application" is the method in which the state of whitening of the surface of the three-dimensional object is better than that in the three-dimensional object manufacturing method of "no work" and worse than that in the three-dimensional object manufacturing method of "surface grinding step". In the experiment, even with the three-dimensional object manufacturing method of "lacquer clear paint application", the state of the bump on the surface of the three-dimensional object improved than that in the three-dimensional object manufacturing method of "surface grinding step" when the lacquer clear paint was applied for six or more times on the surface of the three-dimensional object. In the experiment, the state of the whitening of the surface of the three-dimensional object improved every time the number of times to apply the lacquer clear paint on the surface of the three-dimensional object is increased until the lacquer clear paint is applied to the surface of the three-dimensional object for four or more times.

In FIG. 8, the three-dimensional object manufacturing method of "surface grinding step→lacquer clear paint application" indicates a three-dimensional object manufacturing method in which the surface grinding step of S103 is executed after the support material removing step of S102, the siloxane applying step of S104 and the excess applied solution removing step of S105 are not executed, and the lacquer clear paint is applied in the three-dimensional object manufacturing method shown in FIG. 3. With respect to the three-dimensional object manufacturing method of "surface grinding step→lacquer clear paint application", the state of the bump and the whitening of the surface of the three-dimensional object shown in FIG. 8 is the state of when the number of times the lacquer clear paint is applied to the surface of the three-dimensional object is once. The three-dimensional object manufacturing method of "surface grinding step→lacquer clear paint application" is the method in which the state of the bump on the surface of the three-dimensional object is the best out of the six types of three-dimensional object manufacturing methods shown in FIG. 8. Furthermore, the three-dimensional object manufacturing method of "surface grinding step→lacquer clear paint application" is the method in which the state of whitening of the surface of the three-dimensional object is better than that in the three-dimensional object manufacturing method of "surface grinding step".

In FIG. 8, the three-dimensional object manufacturing method of "siloxane applying step→excess applied solution removing step" indicates a three-dimensional object manufacturing method in which the surface grinding step of S103 is not executed after the support material removing step of S102, and the siloxane applying step of S104 and the excess applied solution removing step of S105 are executed in the three-dimensional object manufacturing method shown in FIG. 3. However, with respect to the three-dimensional object manufacturing method of "siloxane applying step→excess applied solution removing step", the state of the bump and the whitening of the surface of the three-dimensional object shown in FIG. 8 is the state of when the number of times the organopolysiloxane solution is applied to the surface of the three-dimensional object is once. The three-dimensional object manufacturing method of "siloxane applying step→excess applied solution removing step" is the method in which the state of the bump on the surface of the three-dimensional object is better than that in the three-dimensional object manufacturing method of "no work" and worse than that in the three-dimensional object manufacturing method of "lacquer clear paint application". Furthermore, the three-dimensional object manufacturing method of "siloxane applying step excess applied solution removing step" is the method in which the state of whitening of the surface of the three-dimensional object is better than that in the three-dimensional object manufacturing method of "surface grinding step→lacquer clear paint application". In the experiment, even with the three-dimensional object manufacturing method of "siloxane applying step→excess applied solution removing step", the state of the bump on the surface of the three-dimensional object improved than the three-dimensional object manufacturing method of "surface grinding step" when the organopolysiloxane solution is applied for 13 to 16 times or more on the surface of the three-dimensional object. In the experiment, the state of the whitening of the surface of the three-dimensional object improved every time the number of times to apply the organopolysiloxane solution on the surface of the three-dimensional object is increased until the organopolysiloxane solution is applied to the surface of the three-dimensional object for 7 to 10 times or more. The state of whitening of the surface of the three-dimensional object, however, significantly improves even if the number of times to apply the organopolysiloxane solution on the surface of the three-dimensional object is once. For example, in the experiment, the case of applying the organopolysiloxane solution once on the surface of the three-dimensional object with the three-dimensional object manufacturing method of "siloxane applying step→excess applied solution removing step" is better than the case of applying the lacquer clear paint for six times on the surface of the three-dimensional object with the three-dimensional object manufacturing method of "lacquer clear paint application".

In FIG. 8, the three-dimensional object manufacturing method of "surface grinding step→siloxane applying step→excess applied solution removing step" indicates the three-dimensional object manufacturing method shown in FIG. 3. However, with respect to the three-dimensional object manufacturing method of "surface grinding step→siloxane applying step→excess applied solution removing step", the state of the bump and the whitening of the surface of the three-dimensional object shown in FIG. 8 is the state of when the number of times the organopolysiloxane solution is applied to the surface of the three-dimensional object is once. The three-dimensional object manufacturing method of "surface grinding step→siloxane applying step→excess applied solution removing step" is the method in which the state of the bump on the surface of the three-dimensional object is better than that in the three-dimensional object manufacturing method of "surface grinding step" and worse than that in the three-dimensional object manufacturing method of "surface grinding step→lacquer clear paint application". Furthermore, the three-dimensional object manufacturing method of "surface grinding step→siloxane applying step→excess applied solution removing step" is the method in which the state of whitening of the surface of the three-dimensional object is the best out of the six types of three-dimensional object manufacturing methods shown in FIG. 8.

What is claimed is:

1. A three-dimensional object manufacturing method including a 3D object forming step of forming a three-dimensional object by discharging a UV curing type ink, carrying out UV irradiation on the discharged ink to form a layer, and overlapping a plurality of the layers; wherein
the 3D object forming step includes
with a model material and a support material adjacent to each other, the model material serving as the ink to become at least a part of the three-dimensional object and the support material serving as the ink that is at least disposed on a lower side of the model material in a vertical direction to support the model material,
a step of simultaneously planarizing a surface of the model material and a surface of the support material with a planarizing member before curing;
the three-dimensional object manufacturing method further includes
a support material removing step of removing the support material from the three-dimensional object after the 3D object forming step; and
a whitening suppressing solution applying step of applying a whitening suppressing solution for suppressing whitening of a surface of the three-dimensional object on the surface after the support material removing step; and
the whitening suppressing solution is a liquid containing:
a transparent liquid that makes the support material transparent, and
a film forming substance that forms a film on the surface by drying of the transparent liquid.

2. The three-dimensional object manufacturing method according to claim 1, wherein the film forming substance is siloxane.

3. The three-dimensional object manufacturing method according to claim 2, wherein the siloxane is organopolysiloxane.

4. The three-dimensional object manufacturing method according to claim 1, wherein a surface grinding step of grinding the surface is arranged after the support material removing step and before the whitening suppressing solution applying step.

5. The three-dimensional object manufacturing method according to claim 1, wherein the whitening suppressing solution applying step is a step of repeating, over plural times, application of the whitening suppressing solution to the surface and drying of the solution.

6. The three-dimensional object manufacturing method according to claim 2, wherein a surface grinding step of grinding the surface is arranged after the support material removing step and before the whitening suppressing solution applying step.

7. The three-dimensional object manufacturing method according to claim 3, wherein a surface grinding step of grinding the surface is arranged after the support material removing step and before the whitening suppressing solution applying step.

8. The three-dimensional object manufacturing method according to claim 2, wherein the whitening suppressing solution applying step is a step of repeating, over plural times, application of the whitening suppressing solution to the surface and drying of the solution.

9. The three-dimensional object manufacturing method according to claim 3, wherein the whitening suppressing solution applying step is a step of repeating, over plural times, application of the whitening suppressing solution to the surface and drying of the solution.

10. The three-dimensional object manufacturing method according to claim 4, wherein the whitening suppressing solution applying step is a step of repeating, over plural times, application of the whitening suppressing solution to the surface and drying of the solution.

* * * * *